United States Patent
Markarian

[15] 3,669,302
[45] June 13, 1972

[54] MOLDED COVER AND VENT FOR ELECTROLYTIC CAPACITORS
[72] Inventor: Mark Markarian, Williamstown, Mass.
[73] Assignee: Sprague Electric Company, North Adams, Mass.
[22] Filed: Aug. 24, 1970
[21] Appl. No.: 66,367

[52] U.S. Cl..................220/44 R, 220/89 B, 220/DIG. 27
[51] Int. Cl..................................................B65d 51/16
[58] Field of Search..............136/177; 220/44, 89 B, 27, 220/DIG. 27, DIG. 19; 264/248; 156/166, 293

[56] References Cited

UNITED STATES PATENTS

| | | | |
|---|---|---|---|
| 2,766,408 | 10/1956 | Georgiev et al. | 220/89 B |
| 3,013,190 | 12/1961 | Nieders | 136/177 |
| 1,895,738 | 1/1933 | Shugg et al. | 220/DIG. 27 |
| 2,182,492 | 12/1939 | Hall | 136/177 |
| 3,401,314 | 9/1968 | Steele, Jr. | 136/177 |

Primary Examiner—Raphael H. Schwartz
Attorney—Connolly and Hutz and Vincent H. Sweeney

[57] ABSTRACT

A molded cover of high melting organic polymer is molded around a low melting vent of organic polymer. The combination is suitable for sealing electrolytic devices.

10 Claims, 1 Drawing Figure

PATENTED JUN 13 1972
3,669,302
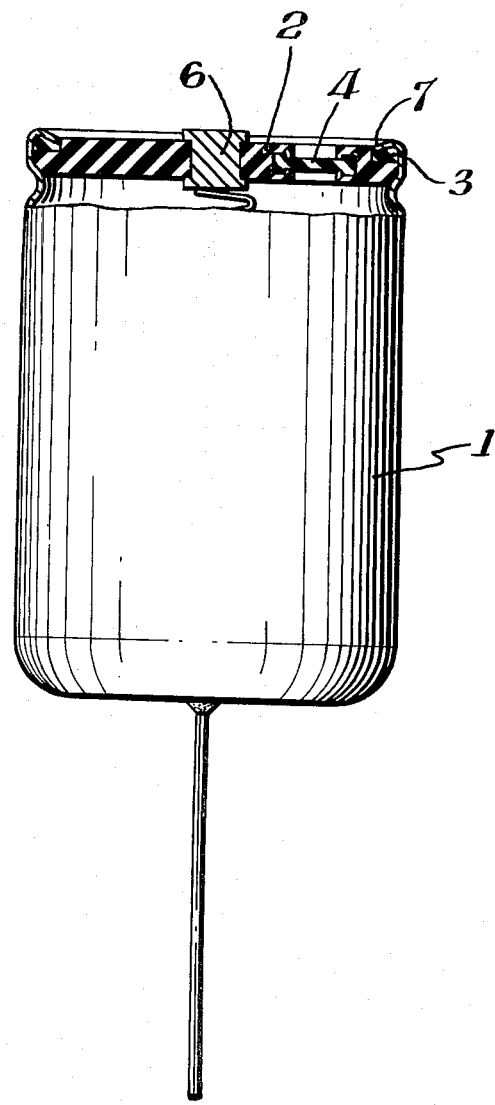

MOLDED COVER AND VENT FOR ELECTROLYTIC CAPACITORS

BACKGROUND OF THE INVENTION

This invention relates to a molded cover and vent for electrolytic devices, and more particularly to electrolytic capacitors having a low cost molded cover with a temperature sensitive venting means for the escape of gas.

In most types of electrolytic devices, especially in the sealed-container type of device, it is the usual practice to provide some kind of vent for the escape of gas generated within the device. These vents must normally be sealed to prevent the escape of the liquid electrolyte, and to prevent the contamination of the electrolyte by gases or liquids from outside the device. Conventional venting mechanisms for aluminum electrolytic capacitors are usually in the form of fusible alloy plugs, wax plugs, rubber diaphragms or plugs which under the influence of heat and/or pressure blow out or melt to release gas pressure within the capacitor. Other types of capacitor vents which are often used are weakened portions of the can body, and thinned areas in polypropylene covers.

Therefore it is an object of the present invention to provide an improved vent for electrolytic devices which has a positive vapor and liquid type seal around the vent.

It is a further object of this invention to provide a simplified low cost cover vent combination by molding the cover directly around a molded vent.

SUMMARY OF THE INVENTION

A cover and vent combination for electrolytic devices wherein the vent is an individually molded thin disc of low melting thermoplastic polymer and the cover is either a high melting thermoplastic or thermoset polymer molded around the vent disc by conventional molding processes. Thermoplastic covers are molded in a manner so that the edge of the vent disc fuses with the molded cover providing a moisture and gas proof seal between the vent disc and cover. Any heating of the electrolyte would generate gases causing an increase in internal pressure. The low melting thermoplastic vent will melt at a predetermined temperature of the electrolyte, and release the internal built up pressure at a temperature below that at which a dangerous pressure will be established within the device.

DESCRIPTION OF THE DRAWINGS

The sole FIGURE shows an electrolytic capacitor sealed by the vent and cover combination of this invention.

DESCRIPTION OF THE PREFERRED EMBODIMENT

The drawing shows a typical electrolytic capacitor comprising a metal container 1 which may be of such a metal that it can constitute one of the condenser electrodes, although the invention is not so limited in that respect. The top of the container 1 is provided with the disc cover 2 composed of either thermoplastic or thermoset polymer. Ring shaped gasket 3 composed of a suitable elastomer fits the outer edge of disc seal 2, and the end of casing 1 is rolled over the ring as at 7, thereby sealing the capacitor.

Vent 4 is a thin circular small disc which is individually molded from a low melting thermoplastic polymer by conventional molding techniques such as injection molding. This disc is then placed in a second mold, and a cover 2 molded around it with a compatible high melting organic polymer. If thermoplastic covers are molded around the vent, then the two moldings will fuse together at the disc edges to form a moisture and gas proof seal between the vent disc and cover body. Metal terminal 6 may also be fixtured in the molding during the second molding operation, and cover 2 would be molded around the terminal. In the alternative, terminal 6 could be inserted into a hole molded into the cover 2.

When cover 2 is assembled as the seal of a capacitor, the low melting thermoplastic polymer disc serves as a vent by melting whenever the internal temperature and pressure becomes excessive, thereby releasing the built up internal pressure. It must be taken into consideration that no sudden extreme pressure will be established within the electrolytic capacitor without a heating thereof, and therefore a pressure relief is provided for the capacitor which will become operative at a predetermined temperature of the electrolyte, and at a temperature below that at which a dangerous pressure will be established within the condenser.

One thermoplastic polymer suited for molding the vent and cover is polyethylene. Polyethylenes have excellent durability, are light in weight and extremely resistant to moisture. Also polyethylenes have excellent chemical resistance. The vent would be molded from a low density polyethylene which has a low heat resistance and which is also impermeable to many liquids and gases. The cover would be molded from high density polyethylene which has a higher heat resistance and a decreased permeability to liquids and gases, thereby making it particularly suitable for sealing the electrolytic capacitor. Low density polyethylene vents having distortion temperatures as low as 90° F at 264 PSI may be used in combination with high density polyethylene covers having distortion temperatures up to 130° F at 264 PSI. It may be assumed that the vents will release within 20° F of their distortion temperatures. Polyethylene vent discs and covers may be molded by the injection molding process. Polypropylene covers which distort at temperatures above 200° F may also be molded around polyethylene vent discs. Polypropylene is particularly suited for molding capacitor covers because of its high heat resistance. Also it has a high surface hardness, chemical inertness, and low permeability making it resistant to attack by most reactive chemicals as are normally used for electrolytes. Polypropylene covers may also be formed by injection molding and are easiest handled in injection molding at moderate pressures and ram speeds.

Venting discs that are designed to melt at higher predetermined temperatures may be formed by molding a polypropylene cover around a high density polyethylene vent which distorts at temperatures above 110° F. The high density polyethylene vent would have a reduced permeability to liquids and gases, and therefore reduce the possibility of loss of electrolyte by diffusion through the vent. The capacitor case however would have to be of increased strength due to the higher temperature and corresponding pressure required to melt the high density polyethylene vent.

Covers of copolymers of styrene and acrylonitrile may be suitably molded around vent discs of polystyrene. These covers have more than adequate electrical properties and may be molded to very close tolerances by injection molding. The copolymers of styrene have a high heat distortion point which may be in the order to 245° F at 264 PSI. Normal polystyrenes may be chosen with distortion temperatures as low as 180° F at 264 PSI and therefore the polystyrene vent would tend to distort and melt at the predetermined temperature releasing the pressure before the cover distorted or exploded. Acrylonitrile butadiene styrene covers may also be suitably molded around polystyrene vent discs. ABS is suitable for all major methods of thermoplastic processing: injection molding, extrusion, calendering, blow molding and sheet forming. It is a satisfactory sealing material for electrolytic devices in that it has good chemical resistance and electrical properties together with excellent dimensional stability at high temperatures.

Nylon vents and covers can also be suitably molded together. The vent disc would be molded nylon 6 which is a polymer of caprolactam, and have a cover of nylon 6/6 molded around it. Nylon 6 may be chosen with a distortion temperature as low as 150° F at 264 PSI and molded in combination with a nylon 6/6 cover having a distortion temperature as high as 380° F at 264 PSI. Nylon 6/6 is a polymer of hexamethylene and adipic acid and can be handled in conventional machines. However because of the fact that nylon 6/6 has a sharp melting point and low melt viscosity, it is necessary to fill molds as quickly as possible, and the use of a booster is usually recommended.

The advantage of molding a thermoplastic cover directly around the vent disc rather than pushing or inserting the vent into the cover is the moisture and gas proof seal formed by the two moldings fusing together at the disc edges. However, thermoset covers may also be molded around thermoplastic vents even though the two moldings would not fuse together at their edges. The advantage to molding thermoset covers around thermoplastic vents is the increased difference in the temperatures at which the vent and cover will distort. A suitable low temperature, low pressure curing epoxy which distorts at temperatures in excess of 500° F at 264 PSI may be molded by such conventional means as transfer molding to form a highly satisfactory cover. Also low temperature, low pressure curing phenolics may also be molded around thermoplastic vents in order to form suitable vent cover combinations.

The invention was described as embodied in an electrolytic capacitor, however it is to be understood that this invention is not limited to electrolytic capacitors and may be applied in reference to other types of electrolytic devices.

What is claimed is:

1. A cover and temperature sensitive vent combination for electrolytic devices comprising a thin preform disc vent of a low melting thermoplastic polymer, a thicker disc cover of a higher melting organic polymer, said cover being integrally sealed to said vent around the edge surfaces of said vent, said vent lying substantially parallel the major plane of said cover and wholly within the thickness dimension of said cover.

2. The cover and vent combination of claim 1 wherein said cover is a higher melting thermoplastic polymer molded around the edge surfaces of said vent in a manner that the edge surface of said vent is thermally fused to the contacting surfaces of said cover.

3. The cover and vent combination of claim 2 wherein said vent is low melting polyethylene and said cover is high melting high density polyethylene.

4. The cover and vent combination of claim 2 wherein said vent is low melting polyethylene and said cover is high melting polypropylene.

5. The cover and vent combination of claim 2 wherein said vent is a low melting high density polyethylene and said cover is high melting polypropylene.

6. The cover and vent combination of claim 2 wherein said vent is low melting polystyrene and said cover is high melting styrene-acrylonitrile.

7. The vent and cover combination of claim 2 wherein said vent is low melting polystyrene and said cover is high melting acrylonitrile butadiene styrene.

8. The vent and cover combination of claim 2 wherein said vent is a low melting polymer of caprolactam and said cover is a high melting polymer of hexamethylene and adipic acid.

9. The vent and cover combination of claim 1 wherein said cover is a higher melting thermoset polymer, said cover is so constructed and arranged as not to distort said preform thermoplastic vent.

10. The vent and cover combination of claim 9 wherein said cover is a low temperature, low pressure curing thermoset polymer selected from the group consisting of epoxies and phenolics.

* * * * *